US010629053B2

(12) United States Patent
Werner et al.

(10) Patent No.: US 10,629,053 B2
(45) Date of Patent: Apr. 21, 2020

(54) AUTOMATIC DETECTION AND ALERT OF AN EMERGENCY FROM SOCIAL MEDIA COMMUNICATION

(71) Applicant: International Business Machines Corporation, Armonk, NY (US)

(72) Inventors: John S. Werner, Fishkill, NY (US); Diane M. Stamboni, Poughkeepsie, NY (US); Eli M. Dow, Wappingers Falls, NY (US); Nicholas G. Danyluk, Long Island City, NY (US); Sarah Wu, Kingston, NY (US); Kavita Sehgal, Poughkeepsie, NY (US); Sneha M. Varghese, Fishkill, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/822,810

(22) Filed: Nov. 27, 2017

(65) Prior Publication Data

US 2019/0164406 A1    May 30, 2019

(51) Int. Cl.
*G08B 21/18* (2006.01)
*G08B 25/00* (2006.01)
(Continued)

(52) U.S. Cl.
CPC ......... *G08B 21/182* (2013.01); *G08B 25/004* (2013.01); *G08B 25/007* (2013.01);
(Continued)

(58) Field of Classification Search
CPC .............. G06F 17/30864; G06Q 10/10; G06Q 10/1093; G06Q 50/01; G06Q 50/265;
(Continued)

(56) References Cited

U.S. PATENT DOCUMENTS 8,478,229 B2 * 7/2013 Velusamy ............... H04L 51/20
    455/404.2
8,751,265 B2   6/2014 Piett et al.
(Continued)

FOREIGN PATENT DOCUMENTS

WO    WO-2016012493 A1    1/2016

OTHER PUBLICATIONS

Nguyen, Dong-Anh, et al. "On Critical Event Observability using Social Networks: A Disaster Monitoring Perspective", Apr. 2014, IEEE, 2014 IEEE Military Communications Conference, pp. 1633-1638, 6 pages (Year: 2014).*

(Continued)

*Primary Examiner* — Stephen R Burgdorf
(74) *Attorney, Agent, or Firm* — Robert J. Shatto

(57) ABSTRACT

A computer monitors a plurality of social media communications. The computer identifies a first social media communication of the plurality of social media communications. The computer evaluates the first social media communication for a first communication emergency level. The computer identifies a first location associated with the first social media communication. The computer groups the first social media communication into a location group based, at least in part, on the identified first location. The computer evaluates a location group emergency level, based, at least in part, on the first communication emergency level of the first social media communication. The computer determines the location group emergency level exceeds a threshold value. The computer issues an emergency warning alert in response to determining that the location group emergency level exceeds the threshold value.

15 Claims, 7 Drawing Sheets

(51) Int. Cl.
*H04L 12/58* (2006.01)
*H04L 12/18* (2006.01)
*G06Q 50/00* (2012.01)

(52) U.S. Cl.
CPC .......... *H04L 12/1895* (2013.01); *H04L 51/20* (2013.01); *H04L 51/32* (2013.01); *G06Q 50/01* (2013.01); *H04L 51/38* (2013.01)

(58) Field of Classification Search
CPC .. G08B 21/182; G08B 25/004; G08B 25/007; G08B 25/016; G08B 27/005; H04L 51/046; H04L 51/32; H04L 51/38; H04L 67/22; H04W 4/02; H04W 4/22; H04W 4/90
USPC ...................................................... 340/573.1
See application file for complete search history.

(56) References Cited

U.S. PATENT DOCUMENTS

| | | | |
|---|---|---|---|
| 9,025,735 | B2 | 5/2015 | Sieg |
| 9,032,000 | B2 | 5/2015 | Barrington et al. |
| 9,043,329 | B1 | 5/2015 | Patton et al. |
| 9,105,039 | B2 | 8/2015 | Kramer et al. |
| 9,408,051 | B2 | 8/2016 | Finney et al. |
| 9,418,705 | B2 | 8/2016 | Kaps et al. |
| 9,516,121 | B2 | 12/2016 | Byrd Vallieres De St. Real et al. |
| 2005/0013417 | A1* | 1/2005 | Zimmers .............. G08B 27/005 379/37 |
| 2007/0226248 | A1 | 9/2007 | Darr |
| 2008/0040427 | A1* | 2/2008 | Shroff ................... G06Q 10/10 709/204 |
| 2009/0240516 | A1* | 9/2009 | Palestrant .............. G06Q 10/10 705/346 |
| 2010/0198833 | A1 | 8/2010 | Depaoli |
| 2011/0111728 | A1 | 5/2011 | Ferguson et al. |
| 2013/0218959 | A1 | 8/2013 | Sa et al. |
| 2013/0304904 | A1* | 11/2013 | Mouline ............... H04L 43/045 709/224 |
| 2014/0120977 | A1* | 5/2014 | Amis .................... H04W 4/023 455/521 |
| 2014/0122604 | A1* | 5/2014 | Enoki ..................... H04L 67/18 709/204 |
| 2014/0188993 | A1* | 7/2014 | Klein ................... G06Q 10/063 709/204 |
| 2014/0195625 | A1 | 7/2014 | Weldon |
| 2015/0186378 | A1 | 7/2015 | Berlingerio et al. |
| 2015/0332581 | A1 | 11/2015 | Gaurav et al. |
| 2016/0012701 | A1* | 1/2016 | Lu ............................. F41H 9/10 222/183 |
| 2016/0026919 | A1* | 1/2016 | Kaisser .................. G06Q 10/06 706/12 |
| 2016/0132924 | A1* | 5/2016 | Thirugnanasundaram .................. G06Q 30/0252 705/14.5 |
| 2016/0283487 | A1 | 9/2016 | Li et al. |
| 2016/0328482 | A1 | 11/2016 | Shah et al. |
| 2016/0381538 | A1* | 12/2016 | Tan ......................... H04W 4/90 455/404.2 |
| 2017/0251347 | A1* | 8/2017 | Mehta ..................... H04W 4/90 |
| 2017/0301213 | A1* | 10/2017 | Davis .................... G08B 21/22 |
| 2018/0146354 | A1* | 5/2018 | Patel ....................... H04W 4/90 |

OTHER PUBLICATIONS

Kryvasheyeu, Yury et al. "Performance of Social Network Sensors during Hurricane Sandy", Feb. 2015, PLOS One, 19 pages (Year: 2015).*

Giannakopoulos et al., "PANIC: Modeling Application Performance over Virtualized Resources", 2015 IEEE International Conference on Cloud Engineering, Mar. 9-13, 2015, Tempe, AZ, USA, pp. 213-218.

Hao et al., "An Approach to Detect Crowd Panic Behavior using Flow-based Feature", University of Huddersfield, Proceedings 22nd International Conference on Automation and Computing, 2016, IEEE, 6 pages, <http://eprints.hud.ac.uk/29079/>.

Johansson et al., "Estimating Citizen Alertness in Crises using Social Media Monitoring and Analysis", 2012 European Intelligence and Security Informatics Conference, © 2012 IEEE, pp. 189-196.

Mell et al., "The NIST Definition of Cloud Computing", National Institute of Standards and Technology, Special Publication 800-145, Sep. 2011, 7 pages.

* cited by examiner

AUTOMATIC DETECTION AND ALERT OF AN EMERGENCY FROM SOCIAL MEDIA COMMUNICATION

BACKGROUND

Emergency situations can happen at any time. Whether in the form of natural disasters or human-caused incidents, unpredictability and a lack of timely information on these incidents help to contribute to large numbers of deaths and injuries each year. People at events or other actives may not have access to the news at all times or may not check the news or other traditional media if they feel no reason to be on alert. Even with access to live news, there is still a delay between an incident occurring, the incident being reported, and news crews being dispatched.

SUMMARY

Disclosed herein are embodiments of a method, system, and computer program product for providing emergency warning. A computer monitors a plurality of social media communications. The computer identifies a first social media communication of the plurality of social media communications. The computer evaluates the first social media communication for a first communication emergency level. The computer identifies a first location associated with the first social media communication. The computer groups the first social media communication into a location group based, at least in part, on the identified first location. The computer evaluates a location group emergency level, based, at least in part, on the first communication emergency level of the first social media communication. The computer determines the location group emergency level exceeds a threshold value. The computer issues an emergency warning alert in response to determining that the location group emergency level exceeds the threshold value.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
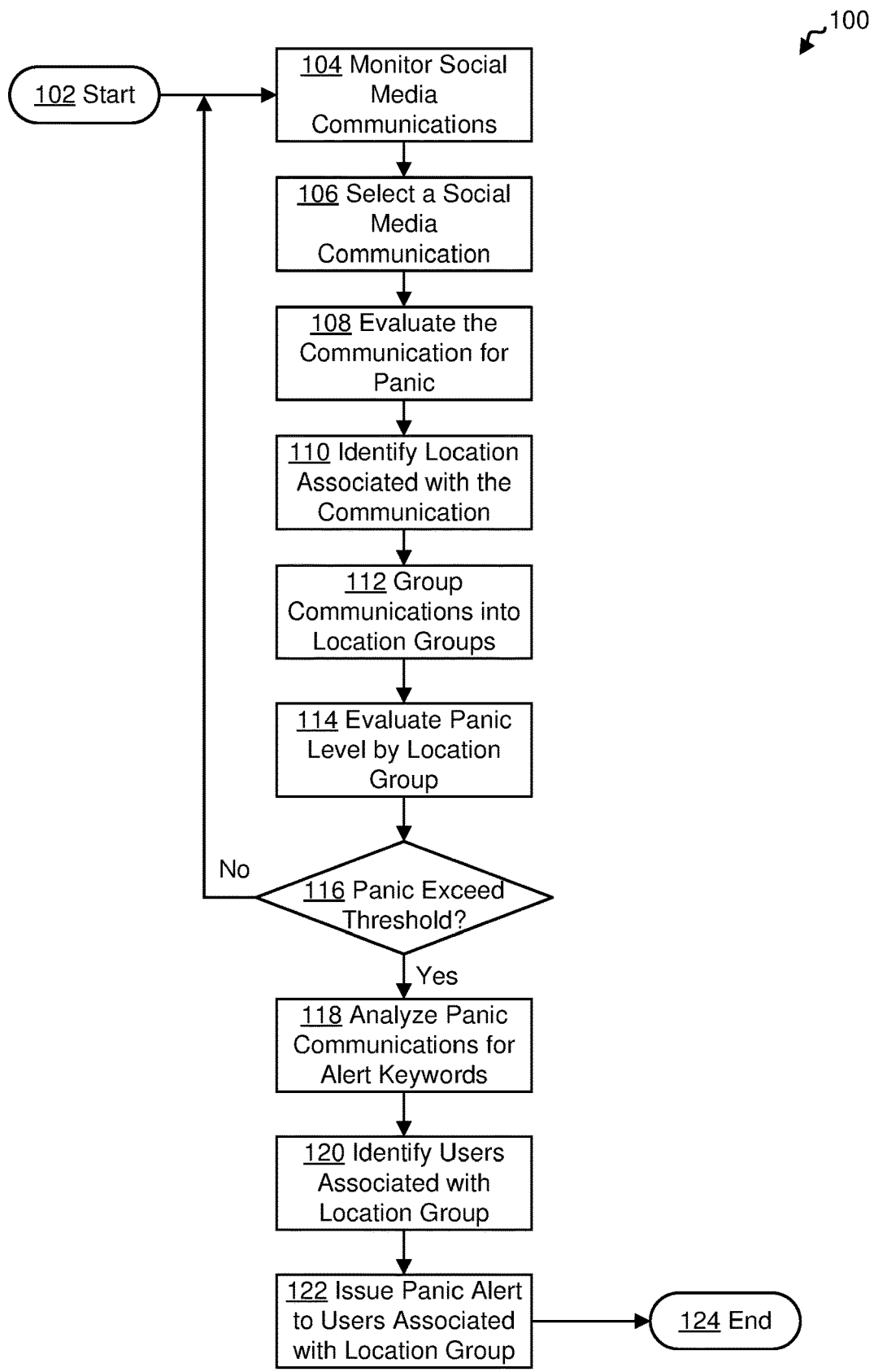
FIG. 1 depicts an example method for providing emergency warning based on panic detected in social media, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to the field of emergency warning systems, and more specifically, to social media based emergency warning systems. While the present disclosure is not necessarily limited to such applications, various aspects of the disclosure can be appreciated through a discussion of various examples using this context.

In contrast to traditional news and traditional media, social media content is generated very rapidly. It can be easy for users of social media to create social media communications in real time. As used herein, social media communications can include communications to various social media platforms, including but not limited to Facebook®, Twitter®, LinkedIn®, Pinterest®, Instagram®, YouTube®, Vine®, Flickr®, Reddit®, Tumblr®, or any similar platform. In some embodiments, social media communications can alternatively or additionally broadly refer to any messages sent between two people including "Snaps®" using Snapchat®, other messages sent using messaging platforms, text messages, and phone calls. Social media communications can refer to any form of communication including posts, "likes," messages, "Tweets®," "Pins®," pictures, video recordings, text messages, phone calls, or audio recordings.

In an emergency situation, people may be able to create and/or access social media communications about the emergency situation before traditional news or traditional media can alert the public about an event in progress. Embodiments of the present disclosure include a method, system, and computer program product which can be used to alert users of a nearby danger faster than traditional media by utilizing social media communications. In contrast to a user needing to access news or visit specific social media sites to learn about an ongoing situation, a warning service (used herein to refer to a company operating an emergency warning app (application) or service and/or the warning app or service itself) can monitor social media communications in an area in real time and warn users of danger. A user can be informed about the danger or emergency before it is covered by traditional media and before they directly access social media sites. A warning service can monitor social media communications, including evaluating social media communications for panic, associating social media communications with locations, grouping social media communications into location groups, evaluating a location group panic level, and determining if a location group panic level exceeds a threshold level. If the location group panic level exceeds the threshold level, the warning service can further analyze the social media communications for keywords (including using natural language processing (NLP)) describing the source of the panic to include in an alert, identify users associated with the location group, and issue a panic alert to those users. As such, the warning service can alert users of an emergency or panic inducing event without the users needing to take any action during the emergency.

The aforementioned improvements and/or advantages of speed of social media and no action on the part of users needed are example improvements and/or advantages. These improvements and/or advantages are a non-exhaustive list of example advantages. Embodiments of the present disclosure exist which can contain none, some, or all of the aforementioned advantages and/or improvements.

Referring now to FIG. 1, depicted is an example method 100 for providing emergency warning based on panic detected in social media, in accordance with embodiments of the present disclosure. The following discussion will refer to method 100 being performed by a warning service. It is to be understood that the warning service can be implemented by (and, hence, method 100 can be performed by) a computer, a collection of computers, one or more virtual machines (including running on a cloud platform), a component of a computer, or firmware or other software running on a computer. Method 100 can include more or less operations than those depicted. Method 100 can include operations in different orders than those depicted, including operations occurring simultaneously.

From start 102, the warning service proceeds to monitor social media communications at 104. As discussed above, social media communications can include communications to various social media platforms, to any messages sent between two people, and can refer to any form of electronic communication including those listed above. This monitoring by the warning service at 104 can be limited to those social media communications created by users of the warning service, can additionally include those social media communications received by users of the warning service, can include all social media communications for a particular platform, can be limited to social media communications located within a country or region, or otherwise be limited. In some embodiments, a user of the warning service can link their account with the warning service to one or more social media platforms to allow the warning service access to their social media communications and/or social media communications received by them. In some embodiments, the warning service can run on a backend server of a social media platform. In some embodiments, a warning service can accept input from users who can directly input a communication that indicates panic to the warning service itself, and in such embodiments, these communications can fall under the term social media communication as used herein.

At 106, the warning service selects a social media communication for further analysis in operations 108 through 112. The warning service can select each social media communication monitored during operation 104 and can perform these operations on each social media communication sequentially or simultaneously in various embodiments.

At 108, the selected social media communication is evaluated for indications of sentiments or emotional states which can indicate an emergency situation, including indications of panic. As used herein, panic can also refer to similar emotional states including fear, distress, alarm, hysteria, terror, and the like. This evaluation can proceed using sentiment analysis to determine the emotional state of the author(s) of the selected social media communication. The sentiment analysis can be used to determine the emotional state of the author(s) generally to be positive, negative, or neutral, and can additionally or alternatively be used to identify a more specific emotional state. This process can utilize varying techniques for such analysis, which can include scanning or searching the communication for keywords or phrases. Included within or separate from the sentiment analysis, the evaluation for indications of panic can include natural language processing (NLP) techniques to parse unstructured text using e.g., part of speech tagging, semantic analysis, lexical analysis, etc. The keywords or phrases can include words or phrases which indicate panic directly, including synonyms for panic or similar emotional states. The analysis can also search for keywords or phrases relating to causes of panic, such as fire, gunman, earthquake, collapse, tornado, terrorist, bomb, help, evacuate, etc. Similarly, the keywords can include antonyms, opposite emotional states, and keywords or phrases indicating safety, including "false alarm," "all clear," etc. which can indicate a lack of panic or reason for panic. In some situations, keywords or phrases which might indicate panic generally, may correspond to a lack of panic when analyzed in context. For example, statements which indicate panic followed by "just kidding," "j/k," "LOL," or similar indications of jest may not indicate panic when so used. In some embodiments, the evaluation can account for such variations in use of keywords or phrases. In some embodiments, known memes or jokes which may otherwise indicate panic may be excluded from indicating panic.

In some embodiments, this evaluation will lead to a simple result of panic or not panic (or in some embodiments a result of "uncertain" is allowed). In such embodiments, a communication panic level (or communication emergency level) can refer to that result expressed in words, or expressed numerically such as +1 for panic, 0 for uncertain, and −1 for not panic. In some embodiments, this evaluation will lead to a result which indicates a communication panic level in more detail, and could include a numerical level of panic (such as a rating of the panic of a communication on a scale of 0 to 10) or a confidence level in a determination of panic or not (such as a determination of 88% probability a communication indicates panic). In some embodiments, the evaluation for indications of panic may include comparing a communication panic level with a threshold value. For example, a communication panic level on a scale of 0 to 10 may indicate panic if greater than or equal to a threshold value of 5.

At 110, the warning service identifies a location associated with the selected social media communication. In some embodiments, the warning service may only identify the location associated with the selected social media communication if the communication indicated panic or had a communication panic level above a threshold value. In other embodiments, the warning service may identify the location associated with any selected social media communication.

A location can be associated with the selected social media communication through a variety of means, including global positioning system (GPS) coordinates associated with the selected social media communication, including where a device which created the communication was when the communication was created. A location can also be associated with a communication due to the content of the communication, including text, images, or video identifying a location. For example, the text of the communication may include a city name or event venue name. Another way in which a communication can be associated with a location is by inclusion of an identifier, such as a hashtag, which contains location identifying information. For example, a social media communication which includes "#downtownmpls" can be associated with the downtown area of Minneapolis, Minn. Various social media platforms have features which can be associated with locations, including events, groups, circles, or other features which may be location specific and the warning service can use such features in associating a communication with a location. For example, a communication posted to the event page of a concert can be associated with the location of that concert. Many alternative ways of identifying a location associated with a communication can exist and can include an IP address used by a device to post the communication, an estimated location of a device based upon recent internet searching, or any other suitable means. In some embodiments, a location can be associated with the selected social media communication based upon previous social media communications from the same user or device having any of the above referenced associations with a location. For example, a user communicating a series of messages in which only one includes a hashtag, may all be associated with a location relating to the hashtag.

In some embodiments, more than one location can be associated with the selected social media communication. This can occur when a selected social media communication is associated with different locations through more than one of these processes (for example, the GPS coordinates of the device and a hashtag used in the communication) or two locations through the same process (for example, two hashtags used in the communication associated with different locations). In some embodiments, this may result in an error and the communication may not be further analyzed. In some embodiments, the communication can be grouped into location groups corresponding to more than one location when there is more than one associated location. In some embodiments, a selected social media communication can be associated with the same location through two or more processes. For example, the GPS coordinates of the device may indicate a communication was sent from a concert venue and the communication may refer to the concert venue (or a concert held there).

At 112, the warning service groups social media communications into location groups based on the association with one or more locations in operation 110. In embodiments which only identified locations for social media communications, if the communications indicated panic or had a communication panic level above a threshold value, operation 112 may be skipped. Location groups can be created in various forms in various embodiments and may range in size. For example, a location group can be created using GPS coordinates of social media communications with locations associated through GPS coordinates. Location groups can be created by grouping together social media communications created at similar GPS coordinates. The warning service can also group together social media communications which include the same or similar hashtags into a location group. Similarly, the warning service can group together social media communications which include the same or similar event or venue name into a location group. Social media communications which are associated with the same location through two or more processes can be used to include communications with associated locations derived from different processes into a location group. For example, continuing the example above where the GPS coordinates of the device indicate a communication was sent from a concert venue and the communication refers to the concert venue, the warning service can use this information to group into one location group communications from nearby GPS coordinates and communications which refer to the concert venue. Many other means for grouping social media communications into location groups based their association with one or more locations can exist.

Location groups can vary in size in embodiments and depending on the location information associated with the social media communications. Examples of different sized location groups include a floor of an office building which may be in panic because of a fire, a concert hall which may encompass a large building which may be in panic because of a shooting, a city which may be in panic because of rioting, or a region which may be in panic because of a pending hurricane. In some embodiments, the size of the location group can depend on the location information used to associate the social media communications with locations in operation 110 (e.g., a hashtag identifying a building compared to a city name). In some embodiments, the other content of the social media communications can additionally be analyzed to determine similarities (e.g., social media communications with varying GPS coordinates all referring to a hurricane may be grouped into a large location group encompassing all of the GPS coordinates, or a portion of the GPS coordinates clustered in proximity to one another).

At 114, the warning service evaluates location group panic levels (or location group emergency levels). The warning service can perform further analysis on those social media communications grouped into each location group separately to determine each location group panic level. The further analysis can vary in embodiments and can entail counting the number of communications which indicate panic and/or communications which do not indicate panic, analyzing a density of communications indicating panic by the area of the location group, comparing a number or percentage of communications indicating panic with a number or percentage of communications which do not indicate panic, or any other appropriate form of analysis. In embodiments where communications were rated on a scale or were given confidence levels regarding the level of panic of a communication, more detailed versions of any of these forms of analysis may be used to incorporate such information. In embodiments where only social media communications which indicated panic or had a level of panic of a communication above a threshold value were associated with locations and grouped, some of these forms of analysis may not be used.

For example, the warning service can count the number of panic communications (communications which indicate panic or which have a communication panic level greater than a threshold value) in the location group and determine the location group panic level is equal to the number of panic communications. In another example, the warning service can count the number of panic communications, count the number of communications which do not indicate panic, compute the percentage of panic communications, and determine the location group panic level is equal to that percentage. In a further example, the warning service can count the number of communications with a communication panic level of 0 out of 10, count the number of communications with a communication panic level of 1 out of 10, etc., compute an average of the communication panic level of the communications within the location group, and determine the location group panic level is equal to that average.

In some embodiments, the warning service can prioritize certain sources and weight communications indicating panic from such sources higher than other sources. In some embodiments, the communications can be given priority status or otherwise be labeled to indicate their prioritized source. For example, an "official" or "verified user" social media account for an event or location may create a social media communication which indicates panic in an attempt to alert those at the event or location of an emergency. However, unless users view that social media communication directly, they may be unaware of the posting without use of this disclosure's warning service. To prevent such a communication from going unnoticed, the warning service may prioritize such a communication and weight that communication or otherwise use this prioritization in the evaluation of the location group panic level to increase the likelihood that an alert will issue in operation 122.

At 116, the warning service compares the location group panic level evaluated at 114 with a threshold value. The format of the threshold value will vary in embodiments and correspond to the format of the location group panic level. For example, in embodiments using the number of panic communications as the location group panic level, the threshold value should be a number of panic communications (e.g. a result of 42 panic communications from operation 114 can be compared to a threshold of 100 panic communications and the warning service can determine 42 does not exceed 100). The number of panic communications could be a function of the size of the event or venue (e.g., a small school that has 300 students may have a threshold of 50, whereas a sporting event held in an arena may have a threshold of 1000). In another example, in embodiments using the percentage of panic communications as the location group panic level, the threshold value should be a percentage of panic communications (e.g. a result of 12 percent panic communications from operation 114 can be compared to a threshold of 10 percent panic communications and the warning service can determine 12 percent exceeds 10 percent). In a further example, in embodiments using the average of the communication panic level of the communications within the location group as the location group panic level, the threshold value should be a number within the range of communication panic level values (e.g. a result of an average communication panic level of 3.5 out of 10 from operation 114 can be compared to a threshold of 3 (within the range of 0 to 10) and the warning service can determine 3.5 exceeds 3). High threshold levels can be used in embodiments to ensure alerts issue only in situations where an emergency is very likely, or low threshold levels can be used in embodiments to offer increased protection at the cost of more false positives (panic alerts in situations where there is no emergency). In some embodiments, when a social media communication which indicates panic comes from a prioritized source, that may automatically trigger a determination that the location group panic level exceeds the threshold.

If the warning service determines at 116 that the location group panic level evaluated at 114 does not exceed a threshold value (or in some embodiments does not exceed or equal), method 100 returns to 104 to continue monitoring social media communications. Over time, method 100 can loop between operations 104 through 116 and as additional social media communications are monitored, selected, and evaluated, the panic level of a location group may later exceed the threshold, changing the result at 116 when method 100 reaches 116 again. This could occur as more people at the location observe and create social media communications about an emergency which indicate panic. In other cases, social media communications which indicate panic may be isolated occurrences which never result in a location group panic level exceeding the threshold.

If at 116 the location group panic level exceeds the threshold (or in some embodiments exceeds or equals), method 100 continues to operation 118. At 118, the warning service analyzes panic communications for keywords describing the source of the panic or any other descriptive information to include in an alert. Operation 118 can be optional in some embodiments. The warning service can search for repeated usage of the same or similar words used in panic communications. For example, if many or all of the panic communications in a location group reference a fire or smoke, the warning service can use the word fire as an alert keyword in operation 122 (discussed below) when issuing an alert, to provide descriptive information to users. In another example, if many or all of the panic communications in a location group include terms such as shooter, bullets flying, shot, rifle, and gunman, the warning service can use this analysis to construct alert keywords of "shooting situation." In a further example, if many or all of the panic communications in a location group include terms indicating a specific location within the location group is the source of the panic, such as "main entrance," such terms can be used as alert keywords. This can include comparing the number of occurrences of such terms or similar terms in the panic communications to an additional threshold. Combinations of alert keywords can be used in some embodiments as appropriate. For example, alert keywords of "fire at the main entrance" can be constructed and used to warn users, such that they exit through other locations. In some cases, the warning service may not be able to determine an alert keyword or keywords which have sufficient consensus in the panic communications and the warning service may determine a generic alert is more appropriate.

At 120, the warning service identifies users associated with the location group. A user can be associated with a location group for a variety of reasons and in various embodiments, one or more reasons may associate users with a location group. Examples of ways a user can be associated with a location group include a user's GPS coordinates are in (or near) the location group, a user's device has collected GPS coordinates of their location over time and the user frequents a location within the location group, a user has created a social media communication which includes text or other information about the location group, a user has created a social media communication which included a hashtag of a location or event within a location group, a user has "followed," subscribed to, or otherwise indicated interest in a location within the location group or an event occurring within the location group (whether this indication of interest was input to the warning service itself or to a linked social media account), an IP address used by a user's device indicates they are at or were recently at a location in the location group, a cell phone tower that a user's device has recently connected to covers an area including the location group, a user has recently been searching the internet for information about a location or event within the location group, or any other suitable means for identifying the user is located within or interested about something within the location group. By alerting users who may not be within the location group physically, but are interested about something within the location group, the warning service can reach users including parents following events their children are at, or who have any other reason to wish to know about an emergency situation they are not present for.

At 122, the warning service issues a panic alert to users associated with the location group. The format and contents of the panic alert can vary in embodiments. The alert can issue in any format which will reach users of the warning service. For example, the warning service may issue one or more of the following: push notification(s), text message(s) including SMS (Short Message Service) message(s), popup notification(s) on users' devices, alert(s) using the Wireless Emergency Alerts system, audible alert(s) on users' devices, vibration alert(s) on users' devices (including haptic alert(s)), email notification(s), or any similar type of alert. In some embodiments, the warning service can select a format of alert based upon alert keywords analyzed or constructed at 118. For example, in situations where panic keywords of "shooting situation" were obtained from the analysis, the warning service may issue a silent or vibration-only alert to avoid giving users' positions away to a gunman. For another example, in situations where a panic keyword of "fire" was obtained from the analysis, the warning service may issue an alert without regard to sound.

The panic alert may be a generic alert such as, "Possible emergency situation, take precautions," "Emergency alert," or any similar alert. If operation 118 was used, the alert can include one or more keywords describing the panic causing situation or emergency. For example, an alert may read "Emergency alert: keyword 'fire,'" "Fire alert," or "Possible shooting emergency, take precautions." The panic alert may also be an audio or video alert, which plays a sound or message to users. Many variations and combinations of types of alerts and contents of alerts can exist, and these examples are not to be read as limiting. After issuing a panic alert at 122, method 100 ends at 124.

In some embodiments, the warning service can employ a procedure for removing social media communications from location groups or otherwise indicating they are expired or no longer current. The time for retention of communications or removal of old communications can vary in embodiments and can vary depending on the content of the communications. For example, hurricane or wildfire related communications may be retained longer as the weather situation may develop over days, but building fire or shooting related communications may expire quickly as the emergency is more likely to be resolved in a matter of minutes or hours, not days. In other embodiments, communications may be associated with their time of creation and older communications may carry less weight in the evaluations of location group panic level. A warning service may utilize such a system for communications relating to crime and by retaining older communications, may issue alerts sooner in high crime areas based upon retention of previous panic communications.

Figure 2:
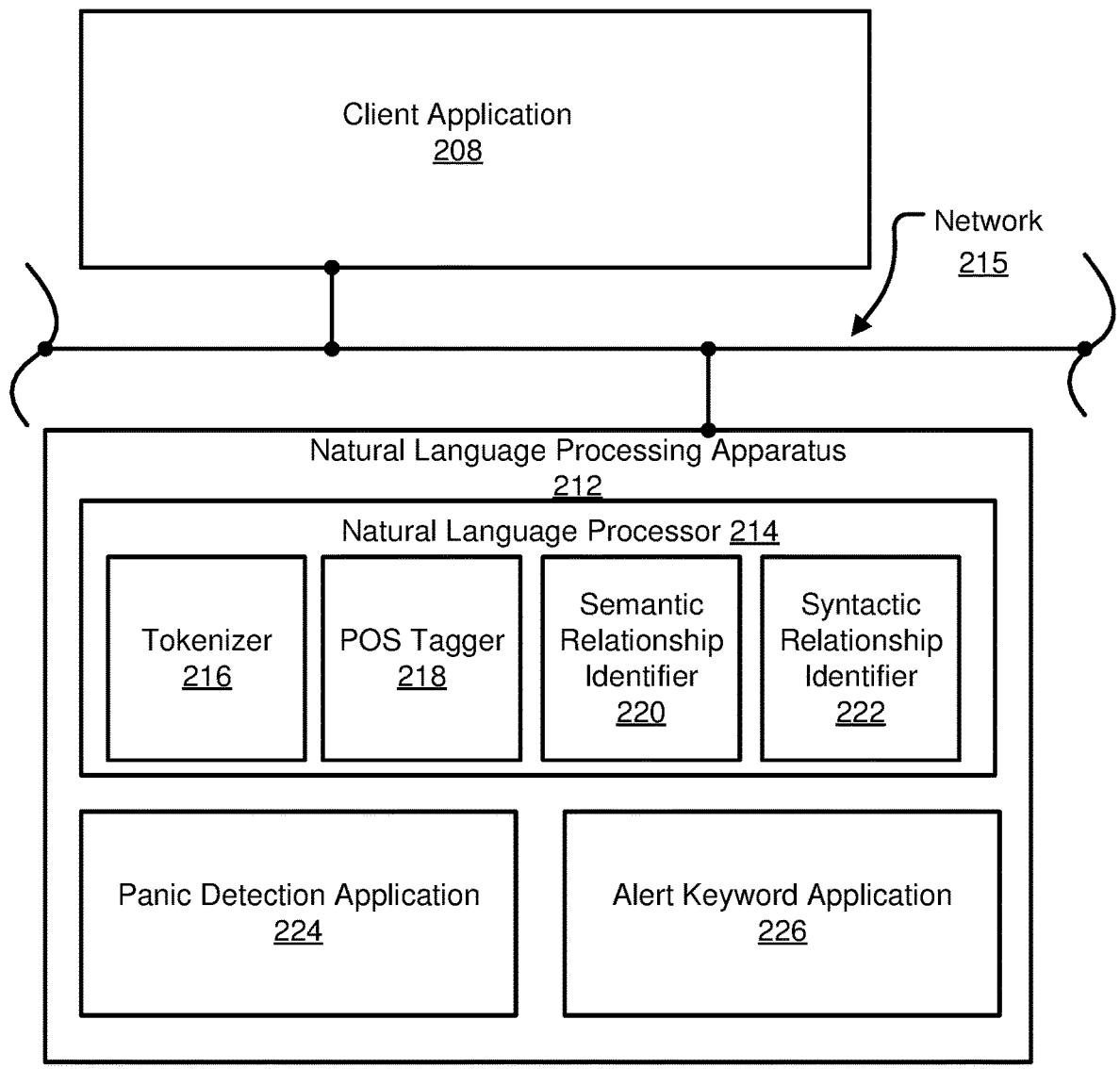
FIG. 2 is a block diagram illustrating a natural language processing system configured to process unstructured data inputs, in accordance with embodiments of the present disclosure.

Turning now to FIG. 2, illustrated is a block diagram of an example natural language processing system 200 configured to process data inputs (e.g., unstructured text social media communications), in accordance with embodiments of the present disclosure. In some embodiments, a remote device (e.g., user device 500 of FIG. 5) can submit input data to be analyzed by the natural language processing apparatus 212, which can be a standalone device, or part of a larger computer system (e.g., included in warning service computer 400 of FIG. 4). In some embodiments, the natural language processing apparatus 212 can retrieve data to be analyzed, such as from social media platforms. Such a natural language processing system 200 can include a client application 208, which can itself involve one or more entities operable to generate or modify unstructured input data that is then dispatched to a natural language processing apparatus 212 via a network 215.

Consistent with various embodiments, the natural language processing apparatus 212 can respond to electronic document submissions sent by a client application 208. Specifically, the natural language processing apparatus 212 can analyze a received unstructured data input (e.g., social media communication) and prepare the unstructured data input for analysis of panic level and/or identification of panic alert keywords.

The natural language processor 214 can be configured to implement one or more computer modules or instructions to analyze the received unstructured input data. The natural language processor 214 can perform various methods and techniques for analyzing electronic documents (e.g., syntactic analysis, semantic analysis, etc.). The natural language processor 214 can be configured to recognize and analyze any number of natural languages. In some embodiments, the natural language processor 214 can parse passages of the documents. Further, the natural language processor 214 can implement or execute various modules to perform analyses of electronic documents. These modules can include, but are not limited to, a tokenizer 216, a part-of-speech (POS) tagger 218, a semantic relationship identifier 220, and a syntactic relationship identifier 222.

In some embodiments, the tokenizer 216 can be a computer module that performs lexical analysis. The tokenizer 216 can convert a sequence of characters into a sequence of tokens. A token can be a string of characters included in an electronic input document and categorized as a meaningful symbol. Further, in some embodiments, the tokenizer 216 can identify word boundaries in an electronic document and break any text passages within the document into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module that marks up a word in passages to correspond to a particular part of speech. The POS tagger 218 can read a passage or other text in natural language and assign a part of speech to each word or other token. The POS tagger 218 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processing apparatus 212 can populate a text index, a triple store, or a relational database (RDB) to enhance the contextual interpretation of a word or term. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing apparatus 212.

In some embodiments, the semantic relationship identifier 220 can be a computer module that can be configured to identify semantic relationships of recognized text elements (e.g., words, phrases) in documents. In some embodiments, the semantic relationship identifier 220 can determine functional dependencies between entities and other semantic relationships.

Consistent with various embodiments, the syntactic relationship identifier 222 can be a computer module that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 is configured to implement or execute a computer module that can parse a document and generate corresponding data structures for one or more portions of the document. For example, in response to receiving an unstructured textual report at the natural language processing apparatus 212, the natural language processor 214 can output parsed text elements from the report as data structures. In some embodiments, a parsed text element can be represented in the form of a parse tree or other graph structure. To generate the parsed text element, the natural language processor 214 can execute computer modules 216-222.

In some embodiments, the output of natural language processor 214 can be used by a panic detection application 224 in order to determine whether a social media communication contains indications of panic. This can occur in combination with, as part of, or separate from a sentiment analysis of social media communications. In some embodiments, the output of natural language processor 214 can be used by an alert keyword application 226 in order to identify keywords or phrases to be included in a panic alert. Panic detection application 224 and keyword application 226 can be implemented by a processor(s) executing computer instructions. For example, computer instructions for keyword application 226 and panic detection application 224 can be executed by natural language processor 214 or by one or more other computer processors.

Figure 3:
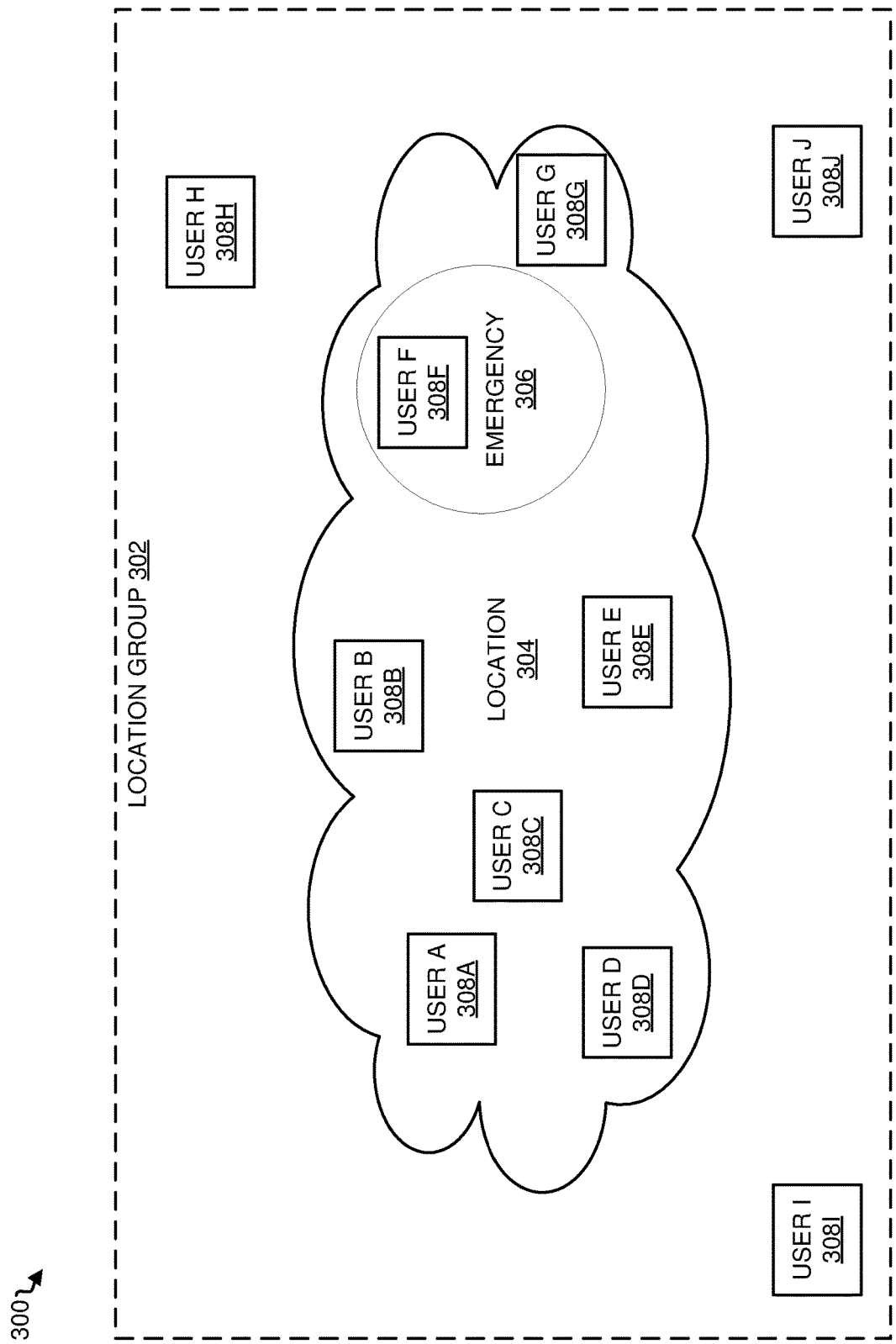
FIG. 3 illustrates a block diagram of an example location group of a warning service, in accordance with embodiments of the present disclosure.

Referring now to FIG. 3, depicted is a block diagram of an example location group 302 of a warning service, in accordance with embodiments of the present disclosure. Location group 302 is shown in a dotted box surrounding the other elements of FIG. 3 and represents that location 304, emergency 306, and user A 308A, user B 308B, etc. through user J 308J (collectively users 308) are all grouped into location group 302. Each of user A 308A, user B 308B, etc. through user J 308J may represent a single user or a group of users. A warning service can create location group 302 through an operation such as operation 112 of FIG. 1.

Location 304 represents a location which one or more social media communications is associated with. One of more social media communications can be associated with location 304 through an operation such as operation 110 of FIG. 1. Location 304 can represent the GPS coordinates of a device which created a social media communication, a location which was contained within the content of a communication, a location associated with a hashtag used in a communication, a location corresponding to a features of a social media platform such as an event, group, circle, or other feature which is location specific, a location associated with an IP address used by a device to create a communication, an estimated location of a device based upon recent internet searching, or a location determined through any other suitable means. Location 304 can be the same for the depicted users A through G (308A-308G) or may vary slightly (such as individual GPS coordinates which are close, but not identical). While one location 304 is shown in FIG. 3, more than one location can be part of a location group 302.

Emergency 306 represents an emergency or situation which causes panic. While emergency 306 is shown present within location 304 and location group 302, it may be located outside either or both of location 304 and location group 302, but where users within those locations are aware of the emergency or panic situation and can create social media communications about the emergency. One or more users, such as user F 308F, can be within the location of the emergency itself or suffering from the emergency.

Users 308 can have varying associations or links to location group 302, location 304, and emergency 306. Some of users 308 can be present physically within location 304, such as users A through G (308A-308G). Some of users 308 can be present outside location 304, but are associated with location group 302 due to following an indicator, such as a hashtag (exemplified by user I 308I), due to being at an event located near location 304 (exemplified by user J 308J), due to being part of a group which is planning on attending an event at location 304 but is not physically there yet (exemplified by user H 308H), or due to any other reason for being associated with a location group 302. This concept is discussed in more detail above with regard to operation 120 of FIG. 1.

Some or all of users 308 can have created social media communications which are associated with location 304 and were grouped into location group 302. These concepts are discussed in more detail above with regard to operations 110 and 112 of FIG. 1. For example, user G 308G can have created a social media communication from a device with GPS coordinates associated with location 304. For another example, user C 308C can have created a social media communication referencing an event at location 304. Some or all of these social media communications can have a communication panic level which does not indicate panic. For example, user D 308D can have created a social media communication without reference to the emergency, possibly due to their position as the farthest from the emergency. Some or all of users 308 may not have created social media communications, but are users of the warning service which will receive alerts in the event that the location group panic level exceeds a threshold. For example, users A, B, and E may not be using social media and may not have created social media communications. User F (308), which can be a group of users, may have created social media communications that indicate a communication panic level exceeding the threshold. Once the location group panic level threshold is exceeded, the warning service may notify all users at location 304 including users A through G (308A-308G). Additionally, the system may or may not notify some or all of users H through J (308H-308J) depending upon the emergency, their locations, etc. and any notification to those users may come at the same time as the initial notification to users A through G (308A-308G) or may come at a later time.

The number of users 308 and roles assigned to users 308 are presented for illustrative purposes only. Any number of users 308 can exist and each can have varying associations or links to location group 302, location 304, and emergency 306.

Figure 4:
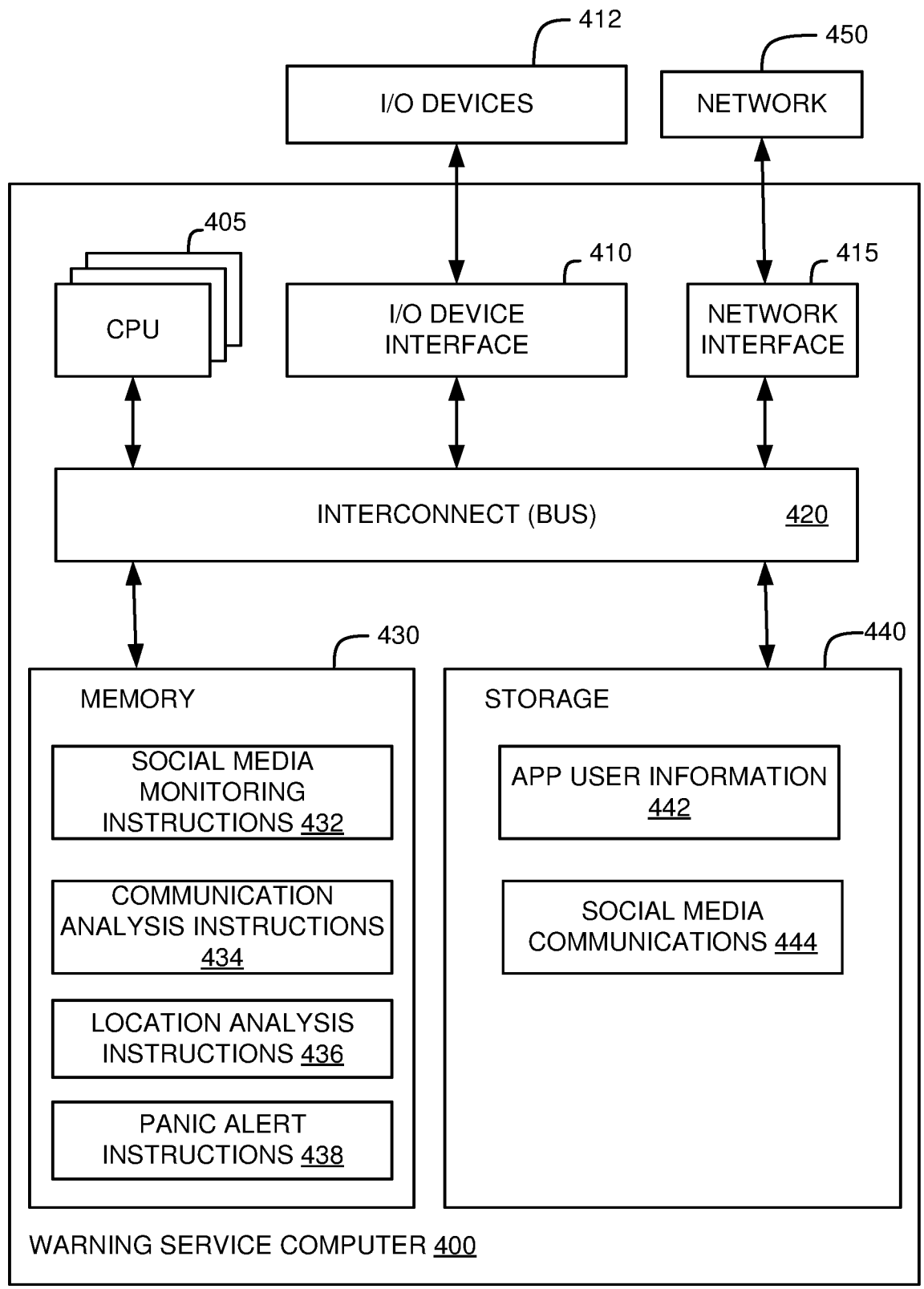
FIG. 4 illustrates a block diagram of an example warning service computer, in accordance with some embodiments of the present disclosure.

Referring now to FIG. 4, illustrated is a block diagram of an example warning service computer 400, in accordance with some embodiments of the present disclosure. In some embodiments, warning service computer 400 performs one or more operations in accordance with FIG. 1 as described above. The warning service computer 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440. In some embodiments, warning service computer 400 can be a virtual machine which uses a portion of one or more CPUs 405, a portion of memory 430, and a portion of storage 440 or otherwise shares resources.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash). In some embodiments, the memory 430 can be in the form of modules (e.g., dual in-line memory modules).

The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the warning service computer 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of warning service computer 400 includes social media monitoring instructions 432, communication analysis instructions 434, location analysis instructions 436, and panic alert instructions 438. In some embodiments, these instructions individually or together perform one or more operations in accordance with FIG. 1 as described above.

Social media monitoring instructions 432 can be processor-executable instructions for monitoring social media communications. Social media monitoring instructions 432 can contain instructions for monitoring the social media communications of the users of a warning service, social media communications received by users of a warning service, all social media communications for a particular platform, social media communications located within a country or region, or can otherwise contain instructions governing the social media communications to monitor. In some embodiments, social media monitoring instructions 432 can monitor input from users of a warning service who directly input communications to the warning service itself.

Communication analysis instructions 434 can be processor-executable instructions for selecting and evaluating social media communications. Communication analysis instructions 434 can vary in embodiments depending on the type of social media communications monitored by social media monitoring instructions 432 and the evaluation to be performed. Communication analysis instructions 434 can include instructions for sentiment analysis, including dictionaries or other arrangements of keywords or phrases which indicate panic, which indicate a lack of panic, or which are otherwise relevant to a determination of a communication panic level. In some embodiments, communication analysis instructions 434 can include instructions for analyzing panic communications for alert keywords for use in alerts to be sent by a warning service, including determining whether keywords describe the source of the panic or contain any other descriptive information to include in an alert.

Communication analysis instructions 434 can include instructions for analyzing and/or structuring unstructured data, including text, image, audio, and video social media communications. This can include image, video, and/or audio processing instructions, configured to extract or generate language or text from these various inputs (e.g., extract street sign text ("1$^{st}$ Avenue") from traffic images, generate text "volcano" from an image of a volcano via image analysis, extract text from speech on an audio recording, etc.). Communication analysis instructions 434 can be executed by one or more CPUs 405 to implement a natural language processing system (such as natural language processing apparatus 212 of FIG. 2) and/or instructions for natural language processing, including processing unstructured data inputs and may use a tokenizer, a part-of-speech (POS) tagger, a semantic relationship identifier, and a syntactic relationship identifier.

Location analysis instructions 436 can be processor-executable instructions for identifying one or more locations associated with social media communications and grouping social media communications into location groups. The form of location analysis instructions 436 can vary in embodiments and can depend on the social media platform or platforms which are the source or destination of the social media communications. Location analysis instructions can include instructions for receiving or collecting GPS coordinates of user devices which create social media communications, for analyzing indicators such as hashtags for location relevance, for analyzing event or location names for corresponding locations, for analyzing various social media features such as events, groups, circles, or similar features for location information, for analyzing locations associated with IP addresses of devices creating social media communications, for analyzing location information of devices based upon recent internet searches, or for any other location analysis relevant to locations of devices or users of social media communications and the warning service. Location analysis instructions 436 can also include instructions for grouping social media communications into location groups including determining which social media communications to group together based upon locations associated with the social media communications and determining the size and area of location groups.

Panic alert instructions 438 can be processor-executable instructions for identifying users associated with a location group to send one or more alerts to, for creating one or more alerts, and for issuing the one or more alerts. In some embodiments, panic alert instructions 438 can include the instructions for analyzing panic communications for alert keywords for use in alerts to be sent by a warning service described above with regard to communication analysis instructions 434, including determining whether keywords describe the source of the panic or contain any other descriptive information to include in an alert. Panic alert instructions 438 can also include instructions for creating one or more alerts, which may include any keywords or phrases which describe the source of the panic or contain any other descriptive information. Panic alert instructions 438 can include instructions for issuing one or more alerts in a format appropriate for various embodiments or for types of panic situations or emergencies. For example, panic alert instructions 438 can include instructions to determine one or more of the following formats for alert and instructions to issue such alert: push notification(s), text message(s) including SMS (Short Message Service) message(s), popup notification(s) on users' devices, alert(s) using the Wireless Emergency Alerts system, audible alert(s) on users' devices, vibration alert(s) on users' devices (including haptic alert(s)), email notification(s), or any similar type of alert.

Storage 440 contains app user information 442 and social media communications 444. In some embodiments, this information and these communications can be used individually or together in the performance of one or more operations in accordance with FIG. 1 as described above.

App user information 442 can be information received by the warning service computer 400 about users through varying means in embodiments. The form of app user information 442 can vary in embodiments. App user information 442 can include GPS coordinates where users have created social media communications and/or GPS information where users have visited. App user information 442 can include information provided by app users to the warning service during a registration or account setup process and can include a preferred way to receive alerts, one or more social media accounts used by the users, and one or more hashtags, events, groups, circles, locations, or other items of interest that users are following, subscribed to, or otherwise connected to. Many forms of information about users can be received by the warning service computer 400 in various embodiments, and these examples are not to be read as limiting. Some or all of app user information 442 can be used by the warning service or the warning service computer 400 in performance of method 100, such as identifying locations of users and issuing alerts to users.

Social media communications 444 can vary in embodiments. In some embodiments, the warning service computer 400 can create copies of or link to social media communications monitored, evaluated, or otherwise received or part of warning service computer 400's functions. In some embodiments, warning service computer 400 can keep as part of social media communications 444, communications which have not yet expired, for further use in performance of method 100.

In some embodiments as discussed above, the memory 430 stores social media monitoring instructions 432, communication analysis instructions 434, location analysis instructions 436, and panic alert instructions 438, and the storage 440 stores app user information 442 and social media communications 444. However, in various embodiments, each of the social media monitoring instructions 432, communication analysis instructions 434, location analysis instructions 436, panic alert instructions 438, app user information 442, and social media communications 444 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from an administrator and present information to an administrator and/or a device interacting with warning service computer 400.

Logic modules throughout the warning service computer 400—including but not limited to the memory 430, the CPUs 405, and the I/O device interface 410—can communicate failures and changes to one or more components to a hypervisor or operating system (not depicted). The hypervisor or the operating system can allocate the various resources available in the warning service computer 400 and track the location of data in memory 430 and of processes assigned to various CPUs 405. In embodiments that combine or rearrange elements, aspects and capabilities of the logic modules can be combined or redistributed. These variations would be apparent to one skilled in the art.

Figure 5:
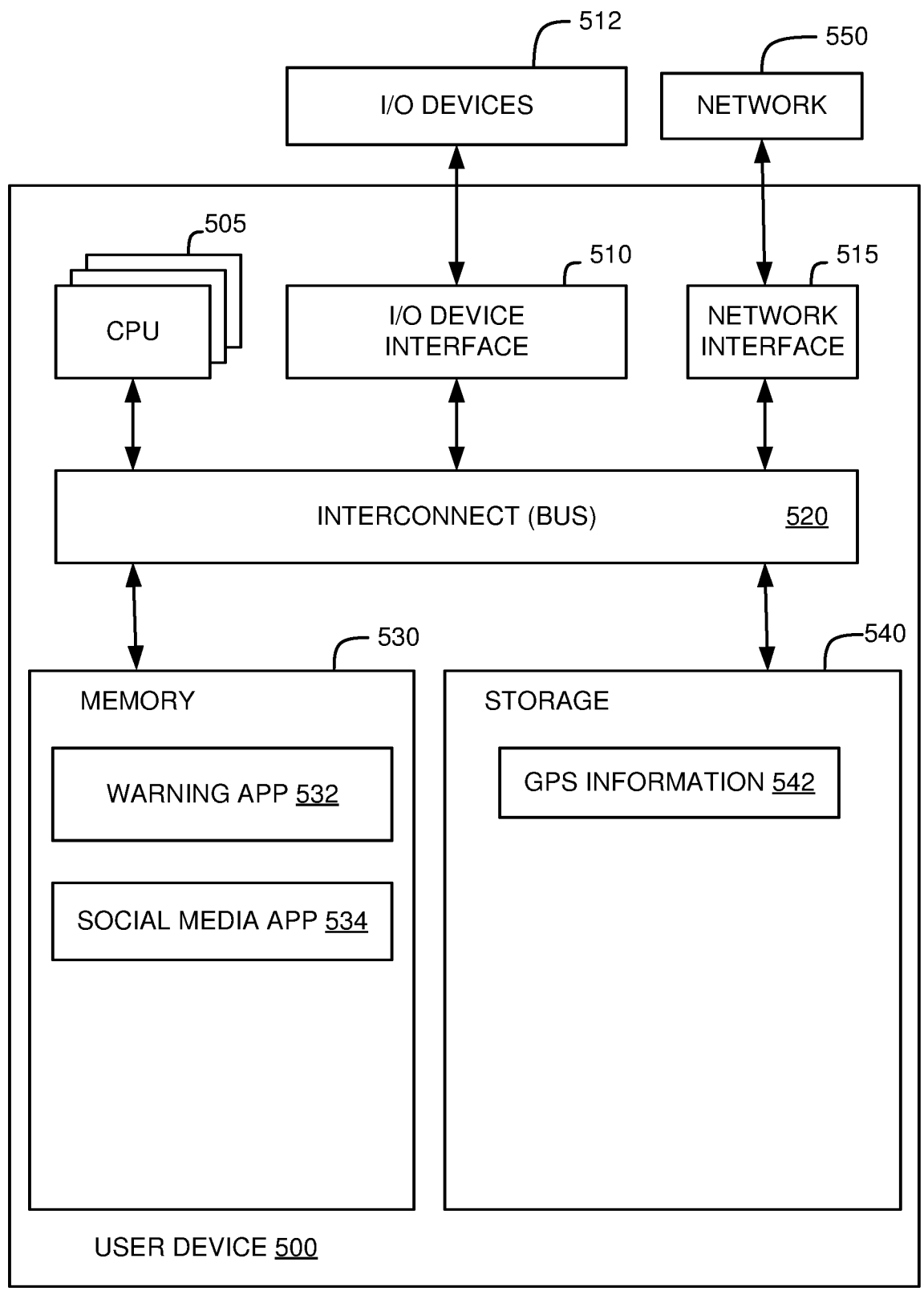
FIG. 5 illustrates a block diagram of an example user device, in accordance with some embodiments of the present disclosure.

Referring now to FIG. 5, illustrated is a block diagram of an example user device 500, in accordance with some embodiments of the present disclosure. In some embodiments, user device 500 performs one or more operations in accordance with FIG. 1 as described above. The user device 500 can include one or more processors 505 (also referred to herein as CPUs 505), an I/O device interface 510 which can be coupled to one or more I/O devices 512, a network interface 515, an interconnect (e.g., BUS) 520, a memory 530, and a storage 540. One or more components depicted in FIG. 5 can be combined or replaced by a microcontroller. Such microcontroller can, for example, contain one or more CPUs, memory, and programmable input/output peripherals. In embodiments employing a microcontroller, the discussion of the various components of user device 500 can apply instead to corresponding aspects of the microcontroller when applicable. In some embodiments, user device 500 can be a virtual machine which uses a portion of one or more CPUs 505, a portion of memory 530, and a portion of storage 540 or otherwise shares resources.

In some embodiments, each CPU 505 can retrieve and execute programming instructions stored in the memory 530 or storage 540. The interconnect 520 can be used to move data, such as programming instructions, between the CPUs 505, I/O device interface 510, network interface 515, memory 530, and storage 540. The interconnect 520 can be implemented using one or more busses. Memory 530 is generally included to be representative of a random access memory (e.g., static random access memory (SRAM), dynamic random access memory (DRAM), or Flash). In some embodiments, the memory 530 can be in the form of modules (e.g., dual in-line memory modules).

The storage 540 is generally included to be representative of a non-volatile memory, such as a hard disk drive, solid state device (SSD), removable memory cards, optical storage, or flash memory devices. In an alternative embodiment, the storage 540 can be replaced by storage area-network (SAN) devices, the cloud, or other devices connected to the user device 500 via the I/O devices 512 or a network 550 via the network interface 515.

The CPUs 505 can be a single CPU, multiple CPUs, a single CPU having multiple processing cores, or multiple CPUs with one or more of them having multiple processing cores in various embodiments. In some embodiments, a processor 505 can be a digital signal processor (DSP). The CPUs 505 can additionally include one or more memory buffers or caches (not depicted) that provide temporary storage of instructions and data for the CPUs 505. The CPUs 505 can be comprised of one or more circuits configured to perform one or more methods consistent with embodiments of the present disclosure.

The memory 530 of user device 500 includes warning app 532 and social media app 534. Warning app 532 can be an application running in memory 530 which receives information from a company operating an emergency warning service and/or the warning service itself. Warning app 532 can serve as a portal for users to enter information to a warning service computer such as warning service computer 400, to enter preferences for formats in which to receive alerts, or otherwise communicate with a warning service. Warning app 532 can receive alerts, such as panic alerts issued as part of operation 122 of method 100.

Social media app 534 can be an application running in memory 530 which a user uses to create social media communications. Many social media platforms offer an app to access their service which can be social media app 534. In some embodiments, a user may use an internet browser or other means for accessing social media and/or creating social media communications.

Storage 540 contains GPS information 542. GPS information 542 can be GPS coordinates saved when creating social media communications, which can be transmitted to a warning service or to a social media platform when social media communications are created. GPS information 542 can also include GPS coordinates of locations where the user of user device 500 frequents, which can be used by a warning service in determining which users to alert when issuing an alert.

In some embodiments as discussed above, the memory 530 stores warning app 532 and social media app 534, and the storage 540 stores GPS information 542. However, in various embodiments, each of the warning app 532, social media app 534, and GSP information 542 are stored partially in memory 530 and partially in storage 540, or they are stored entirely in memory 530 or entirely in storage 540, or they are accessed over a network 550 via the network interface 515.

In various embodiments, the I/O devices 512 can include an interface capable of presenting information and receiving input. For example, I/O devices 512 can receive input from a user and present information to a user and/or a device interacting with user device 500.

Logic modules throughout the user device 500—including but not limited to the memory 530, the CPUs 505, and the I/O device interface 510—can communicate failures and changes to one or more components to a hypervisor or operating system (not depicted). The hypervisor or the operating system can allocate the various resources available in the user device 500 and track the location of data in memory 530 and of processes assigned to various CPUs 505. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
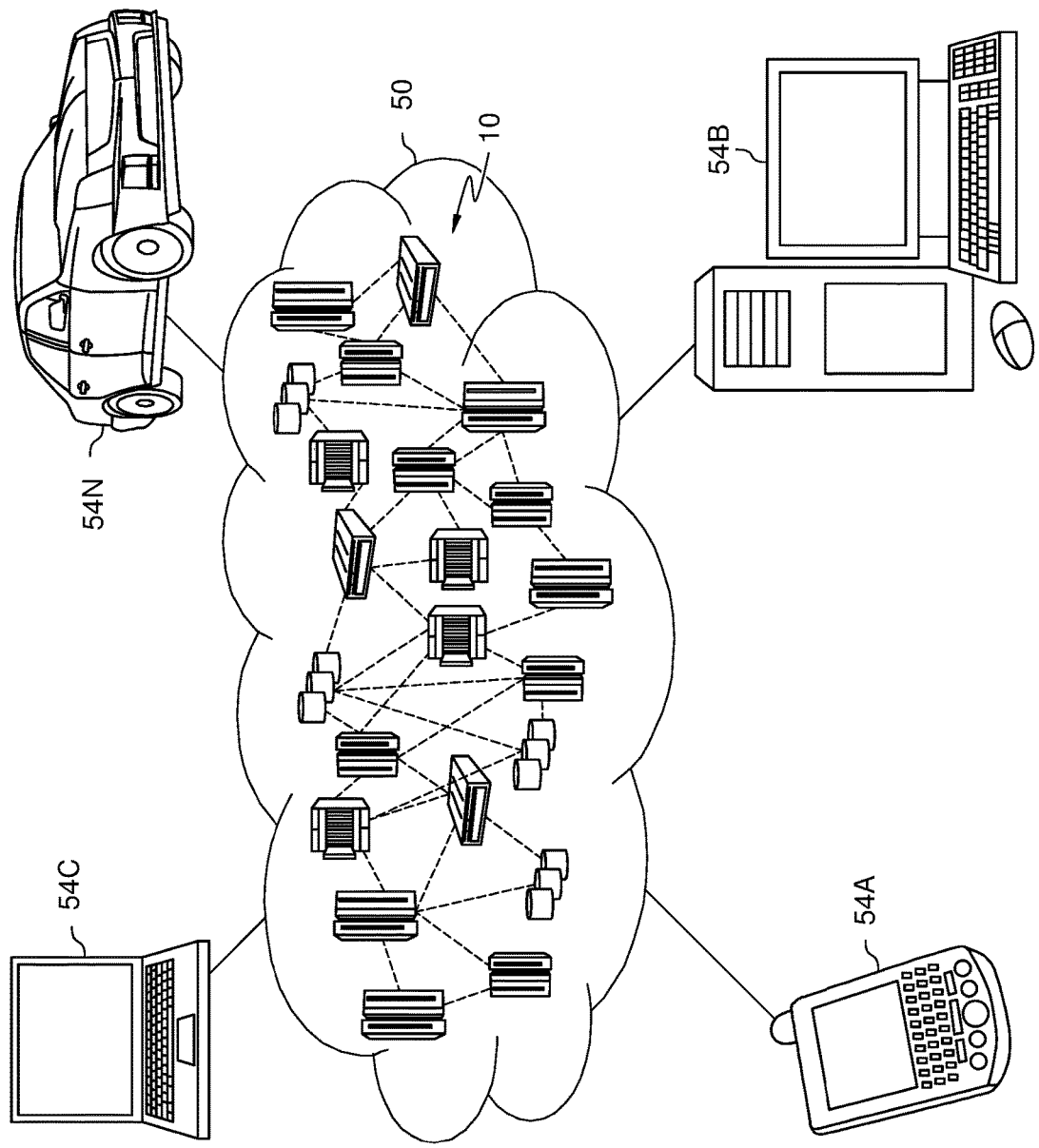
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
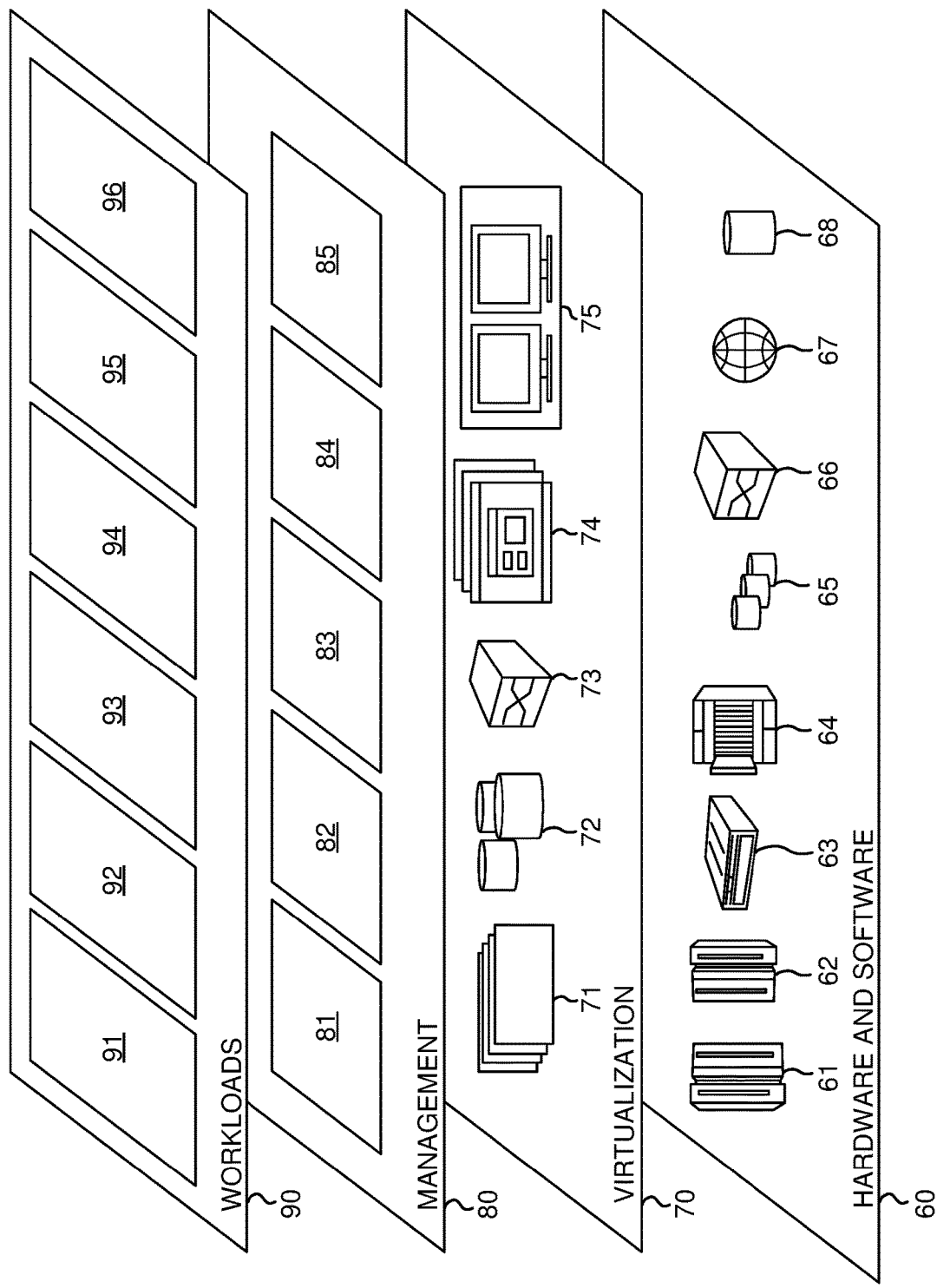
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social media communication monitoring and evaluating 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for providing emergency warning, the method comprising:
   monitoring, by a computer, a plurality of social media communications;
   identifying, by the computer, a first social media communication of the plurality of social media communications;
   evaluating, by the computer, the first social media communication for a first communication emergency level, wherein the evaluating the first social media communication for a first communication emergency level comprises using sentiment analysis to evaluate a sentiment of panic;
   identifying, by the computer, a first location associated with the first social media communication;
   grouping, by the computer, the first social media communication into a location group based, at least in part, on the identified first location, wherein the location group comprises a plurality of social media communications, a plurality of users associated with a location, and one or more situations causing panic, and wherein a size of the location group is based, at least in part, on location information used in associating the first social media communication with the first location;
   evaluating, by the computer, a location group emergency level, based, at least in part, on the first communication emergency level of the first social media communication;
   determining, by the computer, the location group emergency level exceeds a threshold value;
   identifying, by the computer, descriptive information from the first social media communication, the descriptive information associated with the sentiment of panic;
   including, by the computer, the descriptive information associated with the sentiment of the panic within the emergency warning alert; and
   issuing, by the computer, an emergency warning alert in response to determining that the location group emergency level exceeds the threshold value.

2. The method of claim 1, wherein the evaluating the first social media communication for the first communication emergency level further comprises determining the first communication emergency level exceeds a communication emergency threshold.

3. The method of claim 2, wherein the evaluating the location group emergency level comprises determining a percentage of the plurality of social media communications which are associated with exceeding the communication emergency threshold.

4. The method of claim 3, wherein the determining the location group emergency level exceeds the threshold value comprises comparing the percentage of the plurality of social media communications which are associated with exceeding the communication emergency threshold with the threshold value.

5. The method of claim 1, the method further comprising:
identifying, by the computer, a second social media communication of the plurality of social media communications;
identifying, by the computer, that the first location is associated with the second social media communication;
determining, by the computer, a source of the second social media communication has priority status for the first location, wherein the priority status is dependent on an identity of the source being associated with the first location;
evaluating, by the computer, the second social media communication for a second communication emergency level;
grouping, by the computer, the second social media communication into the location group; and
wherein the evaluating the location group emergency level includes giving additional weight to the second social media communication.

6. The method of claim 1, wherein the identifying the first location associated with the first social media communication further comprises receiving, by the computer, global positioning system (GPS) coordinates from a device which created the first social media communication.

7. The method of claim 1, wherein the identifying the first location associated with the first social media communication further comprises determining, by the computer, that the first social media communication contains an indicator which is associated with the first location.

8. The method of claim 1, wherein the emergency warning alert is in one or more formats selected from the group consisting of a push notification, a text message, a Wireless Emergency Alert (WEA), a popup message, an audible alert, and a haptic alert.

9. The method of claim 1, the method further comprising:
identifying, by the computer, a plurality of users associated with the location group, wherein the plurality of users includes one or more users who have followed a location associated with the location group; and
wherein the emergency warning alert is issued to the plurality of users associated with the location group.

10. A system for providing emergency warning, the system comprising:
one or more processors; and
a memory communicatively coupled to the one or more processors,
wherein the memory comprises instructions which, when executed by the one or more processors, cause the one or more processors to perform a method comprising the steps of:
monitoring a plurality of social media communications;
identifying a first social media communication of the plurality of social media communications;
evaluating the first social media communication for a first communication emergency level, wherein the evaluating the first social media communication for a first communication emergency level comprises using sentiment analysis to evaluate a sentiment of panic;
identifying a first location associated with the first social media communication;
grouping the first social media communication into a location group based, at least in part, on the identified first location, wherein the location group comprises a plurality of social media communications, a plurality of users associated with a location, and one or more situations causing panic, and wherein a size of the location group is based, at least in part, on location information used in associating the first social media communication with the first location;
evaluating a location group emergency level, based, at least in part, on the first communication emergency level of the first social media communication;
determining the location group emergency level exceeds a threshold value;
identifying descriptive information from the first social media communication, the descriptive information associated with the sentiment of panic;
including the descriptive information associated with the sentiment of the panic within the emergency warning alert; and
issuing an emergency warning alert in response to determining that the location group emergency level exceeds the threshold value.

11. The system of claim 10, wherein the determining the location group emergency level exceeds the threshold value comprises comparing the percentage of the plurality of social media communications which are associated with exceeding the communication emergency threshold with the threshold value.

12. The system of claim 10, the method further comprising:
identifying a plurality of users associated with the location group, wherein the plurality of users includes one or more users who have followed a location associated with the location group; and
wherein the emergency warning alert is issued to the plurality of users associated with the location group.

13. A computer program product for providing emergency warning, the computer program product comprising a computer readable storage medium having program instructions embodied therewith, wherein the computer readable storage medium, the program instructions executable by a computer to perform a method comprising the steps of:
monitoring, by the computer, a plurality of social media communications;
identifying, by the computer, a first social media communication of the plurality of social media communications;
evaluating, by the computer, the first social media communication for a first communication emergency level, wherein the evaluating the first social media communication for a first communication emergency level comprises using sentiment analysis to evaluate a sentiment of panic;
identifying, by the computer, a first location associated with the first social media communication;
grouping, by the computer, the first social media communication into a location group based, at least in part, on the identified first location, wherein the location group comprises a plurality of social media communications, a plurality of users associated with a location, and one or more situations causing panic, and wherein a size of the location group is based, at least in part, on location information used in associating the first social media communication with the first location;

evaluating, by the computer, a location group emergency level, based, at least in part, on the first communication emergency level of the first social media communication;

determining, by the computer, the location group emergency level exceeds a threshold value;

identifying, by the computer, descriptive information from the first social media communication, the descriptive information associated with the sentiment of panic;

including, by the computer, the descriptive information associated with the sentiment of the panic within the emergency warning alert; and issuing, by the computer, an emergency warning alert in response to determining that the location group emergency level exceeds the threshold value.

14. The computer program product of claim 13, wherein the determining the location group emergency level exceeds the threshold value comprises comparing the percentage of the plurality of social media communications which are associated with exceeding the communication emergency threshold with the threshold value.

15. The computer program product of claim 13, the method further comprising:

identifying a plurality of users associated with the location group, wherein the plurality of users includes one or more users who have followed a location associated with the location group; and wherein the emergency warning alert is issued to the plurality of users associated with the location group.

* * * * *